(12) United States Patent
Fosaaen et al.

(10) Patent No.: US 6,533,986 B1
(45) Date of Patent: Mar. 18, 2003

(54) METHOD AND APPARATUS FOR MAKING CERAMIC CORES AND OTHER ARTICLES

(75) Inventors: Ken Ervin Fosaaen, Morristown, TN (US); Travis Lee Yates, Morristown, TN (US); Robert Eugene Measley, Morristown, TN (US)

(73) Assignee: Howmet Research Corporation, Whitehall, MI (US)

( * ) Notice: Subject to any disclaimer, the term of this patent is extended or adjusted under 35 U.S.C. 154(b) by 0 days.

(21) Appl. No.: 09/504,755

(22) Filed: Feb. 16, 2000

(51) Int. Cl.[7] .................................................. B29C 71/02
(52) U.S. Cl. .................. 264/314; 264/322; 264/348; 264/DIG. 65; 425/389; 425/403; 425/DIG. 44
(58) Field of Search .................................. 264/313, 314, 264/322, 348, 570, 645, 657, 667, 672, 255, 256, 328.2, DIG. 65; 425/389, 423, DIG. 44

(56) References Cited

U.S. PATENT DOCUMENTS

| | | | |
|---|---|---|---|
| 3,953,562 A | * | 4/1976 | Hait et al. ..................... 264/63 |
| 4,582,681 A | * | 4/1986 | Asari et al. .................... 419/49 |
| 4,708,838 A | * | 11/1987 | Bandyopadhyay et al. ... 264/63 |
| 5,129,813 A | | 7/1992 | Shepherd ..................... 425/504 |
| 5,314,646 A | | 5/1994 | Strobel et al. ................. 264/6 |
| 5,342,463 A | * | 8/1994 | Addeo et al. ................ 156/156 |
| 5,468,315 A | * | 11/1995 | Okada et al. .................. 156/64 |
| 5,614,053 A | * | 3/1997 | Toudo et al. ................. 156/312 |
| 5,735,335 A | | 4/1998 | Gilmore et al. ............. 164/516 |
| 5,803,852 A | | 9/1998 | Agostinelli et al. ......... 474/161 |
| 5,839,618 A | | 11/1998 | Chatterjee et al. .......... 222/361 |
| 5,857,358 A | * | 1/1999 | De Vries, Jr. et al. ........ 65/106 |
| 6,290,895 B1 | * | 9/2001 | Wang et al. ................. 264/510 |

* cited by examiner

Primary Examiner—Stefan Staicovici

(57) ABSTRACT

A green ceramic core or other article at elevated temperature is placed between a complaint member and a relatively rigid setter while the green core or article cools to a lower temperature. The compliant member can comprise a fluid pressurized compliant bladder or a compliant, non-rigid setter or facing layer thereon for contacting a side of the green core or article.

7 Claims, 5 Drawing Sheets

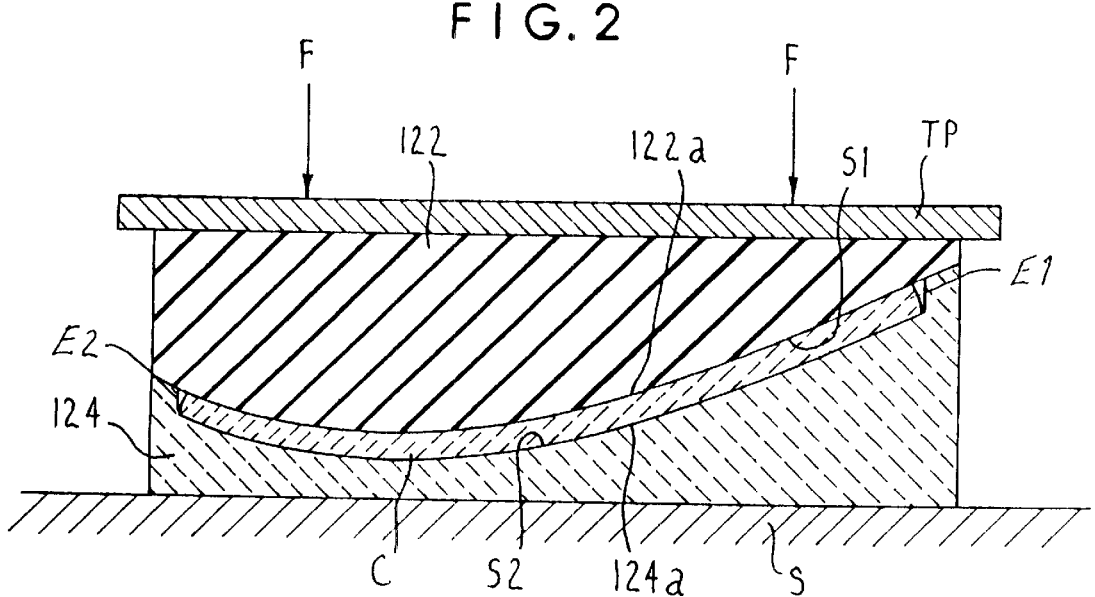
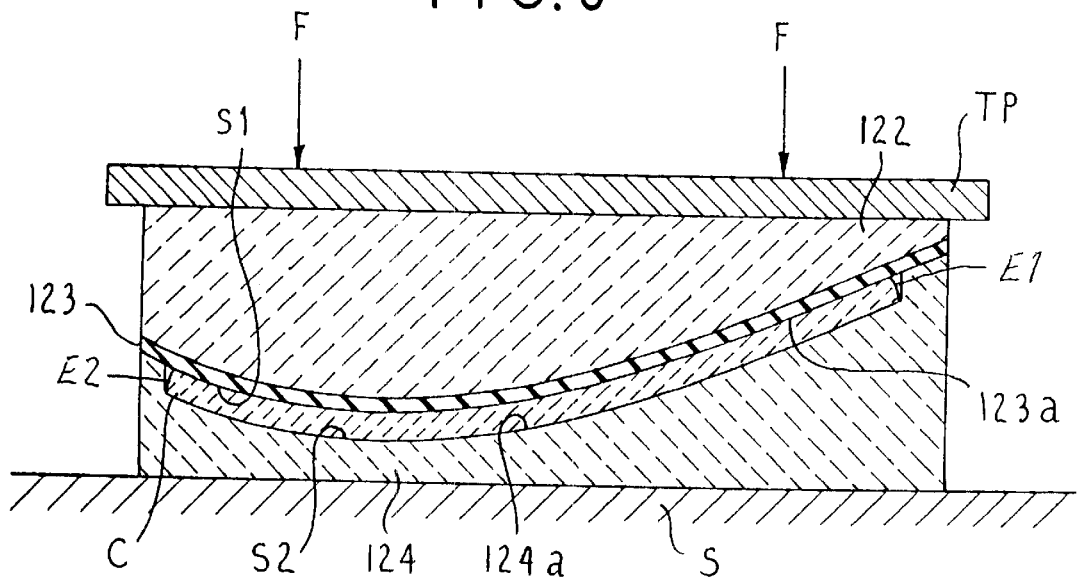

METHOD AND APPARATUS FOR MAKING CERAMIC CORES AND OTHER ARTICLES

FIELD OF THE INVENTION

The present invention relates to a method and apparatus for making a ceramic or other articles to reduce dimensional changes as they cool from an elevated temperature to a lower temperature.

BACKGROUND OF THE INVENTION

Most manufacturers of gas turbine engines are evaluating advanced investment cast turbine airfoils (i.e. turbine blade or vane) which include intricate air cooling channels to improve efficiency of airfoil internal cooling to permit greater engine thrust and provide satisfactory airfoil service life. Internal cooling passages are formed in the cast airfoils using one or more thin ceramic cores positioned in a ceramic shell mold where the molten metal is cast in the mold about the core. After the molten metal solidifies, the mold and core are removed to leave a cast airfoil with one or more internal passages where the cores formerly resided.

The ceramic core is typically made using a plasticized ceramic compound comprising ceramic flour, binder and various additives. The ceramic compound is injection molded, or transfer molded at elevated temperature in a core die or mold. When the green core is removed from the die or mold, it typically is placed between top and bottom rigid setters to cool to ambient temperature before core finishing and gauging operations. Since green ceramic cores can warp or twist within the gaps in the rigid setters during cooling, cores can exhibit dimensional variations from one core to the next in a production run of cores. Moreover, the green core may be improperly contacted by the top or bottom setter such that dimensional variations from one core to the next occur in a production run.

An object of the present invention is to provide a method of making a ceramic casting core and other articles using an improved constraint system that reduces dimensional variations as the core/article cools from an elevated temperature to a lower temperature and provides greater uniformity from green core finishing operations.

SUMMARY OF THE INVENTION

In one embodiment of the invention, method and apparatus are provided for making a ceramic core comprising constraining an as formed (green) ceramic core at elevated (superambient) temperature between a compliant member and a relatively rigid setter while the green core cools to a lower temperature. In one embodiment, a green ceramic core at elevated temperature is constrained between a pneumatic or other fluid pressurized compliant bladder and a rigid setter during cooling of the green core to ambient temperature. The compliant bladder may be communicated to a fluid pressurized cavity in a top setter to this end.

In another embodiment, a green ceramic core at elevated temperature is constrained between a first setter comprising a compliant, non-rigid material or facing layer, such as rubber, and a relatively rigid second setter during cooling of the green core to ambient temperature under an applied force.

The present invention is advantageous in making ceramic cores in that a green ceramic core is constrained during cooling to a lower temperature under applied force using a compliant member that can deform enough against the green core to increase surface contact therebetween, reduce localize regions of stress on the core, and promote greater contact of the core with the top and bottom setters to thereby reduce dimensional variations from one core to the next. Similar advantages are achieved in constraining other articles prone to deformation or distortion as they cool from an elevated forming (e.g. molding) or treating (e.g. heat treatment) temperature to a lower temperature. The present invention can be used to this end in manufacture of such other articles as ceramic articles other than ceramic cores, wax patterns used in investment casting, metal or other powder injection molded articles, plastic articles, and the like.

DESCRIPTION OF THE DRAWINGS

FIG. 2 is a similar schematic sectional view of a setter system pursuant to another embodiment of the invention.

FIG. 3 is a similar schematic sectional view of a setter system pursuant to a further embodiment of the invention.

DESCRIPTION OF THE INVENTION

The present invention is described herebelow for purposes of illustration only with respect to manufacture of ceramic cores made by injection molding, transfer molding, or other core-forming techniques where a plasticized ceramic compound is introduced into a core die or mold. An injection or transfer molded ceramic core is molded by injecting the ceramic compound including ceramic powder (e.g. alumina, silica, zircon, zirconia fluor), a binder (e.g. a thermoplastic or cross-linking thermoplastic material) and various additives at elevated temperature into a die at super-ambient die temperature to form a green core. Generally, the green ceramic core removed from a core die or mold will be at an elevated (superambient) temperature in the range of 90 to 450 degrees F. and still retain some inherent core plasticity as a result. The green core is susceptible to warping, twisting or other core deformation after it is removed from the core die or mold during cooling to ambient temperature (e.g. room temperature) at which temperature the core becomes rigid.

Figure 1:
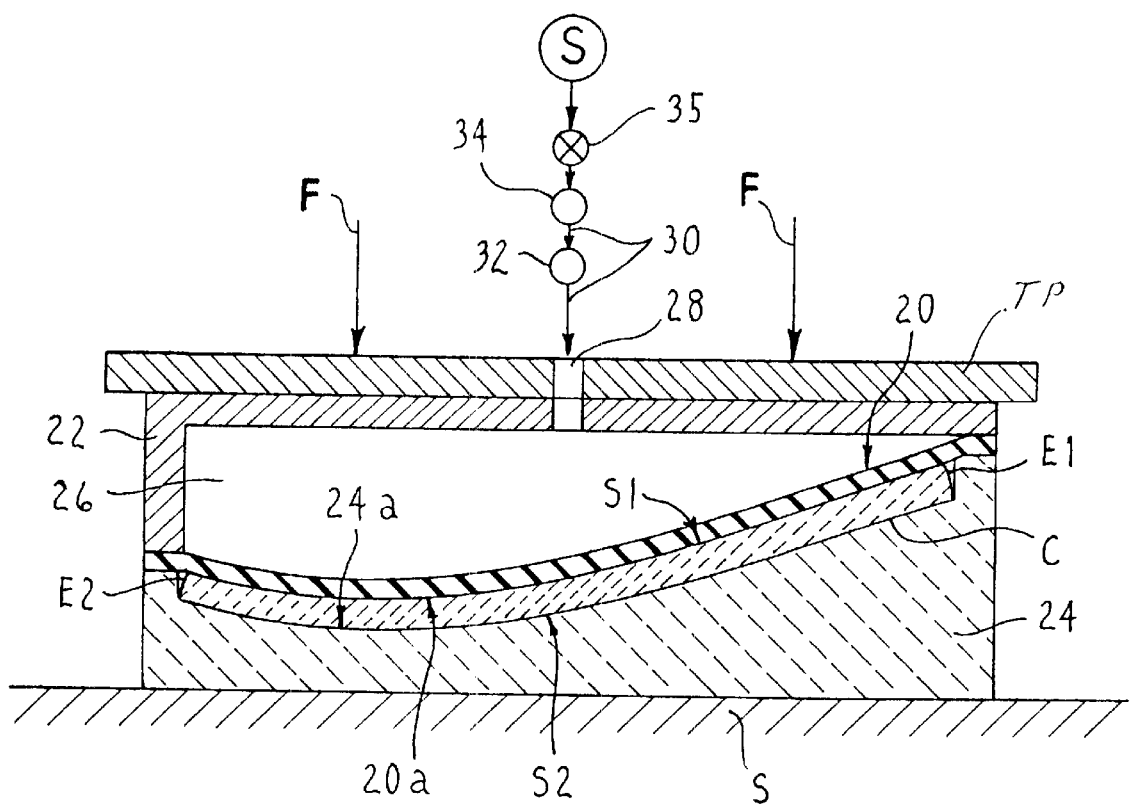
FIG. 1 is a schematic sectional view of a setter system taken transverse to the core longitudinal axis pursuant to an embodiment of the invention.

Referring to FIG. 1, a green ceramic core C freshly removed from a core die or mold (not shown) and at elevated temperature (e.g 300 degrees F.) is shown schematically positioned and constrained between a thin, gas or other fluid pressurized compliant bladder 20 and a rigid bottom setter 24 during cooling of the green core to ambient temperature. The bladder 20 is connected to a rigid top setter 22, which may comprise metal, plastic (e.g REN plastic available from Ciba Geigy Company), ceramic or other material. The top setter 22 is machined or otherwise formed to have a fluid-receiving cavity 26 communicated by a passage 28 to a source of pressurizing fluid S. In an illustrative embodiment of the invention, the fluid source S comprises shop pressurized air connected to drilled passage 28 by air conduit 30 having a pressure gage 32 and pressure regulator 34 in the conduit 30 to adjust and control air pressure in the cavity 26.

When the core C is for use in making gas turbine engine blades or vanes (airfoils), the core will include a thin cross-section having a concave side S1 and a convex side S2 with a leading edge E1 and trailing edge E2 as is well known in the turbine airfoil core art. The sides S1, S2 typically include complex surface features such as ribs, pedestals, turbulators, and the like. The trailing edge E2 typically tapers to a very thin edge that is prone to warp or curl or otherwise distort during core cooling to ambient temperature.

The compliant bladder 20 closes off the cavity 26 and comprises a high temperature resistant rubber typically capable of withstanding temperature of 500 degrees F. A suitable rubber can be selected from platinum catalyst based silicone rubber materials, such as Rohn Poulanc silicone rubber V340-A available from The Smith Group, Warminster, Pa., although other compliant materials may be used in practice of the invention. The bladder 20 is compliant in the context of the invention in that it deforms enough against the side S1 of each green core C to increase surface contact therebetween, reduce localize regions of stress on the core, and promote greater contact of the core with the bottom setter 24 to thereby reduce dimensional variations from one core to the next.

The thickness and durometer value of the compliant bladder 20 can be selected to this end to suit a particular type of ceramic core being constrained. An exemplary thickness and durometer value of the rubber bladder are 3/8 inch and 45-Shore 00 scale. The thin bladder 20 can be preformed and then glued about its periphery to the top setter 22 using silicone caulk or other suitable adhesive that is allowed to cure. The bladder 20 also can be cast directly on the top setter 22 by filling the cavity in the setter with wax, casting the rubber bladder onto the wax-filled setter 22, and removing the wax with heat or chemicals through access passage 28 provided in the setter 22 and top clamp plate TP. Pressure can be applied to the cast bladder to assist in removing wax material from cavity 26 via passage 28.

The rubber bladder 20 typically includes a profiled or contoured surface 20a that corresponds to the outermost profile or contour of the proximate side S1 of the green ceramic core C to be constrained. The contoured surface 20a is flat and does not include surface details, such as pedestals, turbulators, and the like, on core side S1. Alternately, if the rubber bladder 20 is thin enough, the surface 20a of the bladder 20 may be flat and uncontoured.

By virtue of the fluid pressure source S, passage 28, and conduit 30 having a pressure gage 32 and pressure regulator 34, the resilient bladder 20 can be fluid (e.g. air) pressurized in controlled manner as described below.

The rigid bottom (second) setter 24 may comprise metal, plastic (e.g REN plastic available from Ciba Geigy Company), ceramic or other relatively rigid/stiff material that includes a core receiving surface 24a that corresponds to the outermost profile or contour of the proximate side S2 of the green ceramic core C to be constrained. The contoured surface 24a is flat and does not include surface details, such as pedestals, turbulators, and the like, on core side S2.

Figure 2A:
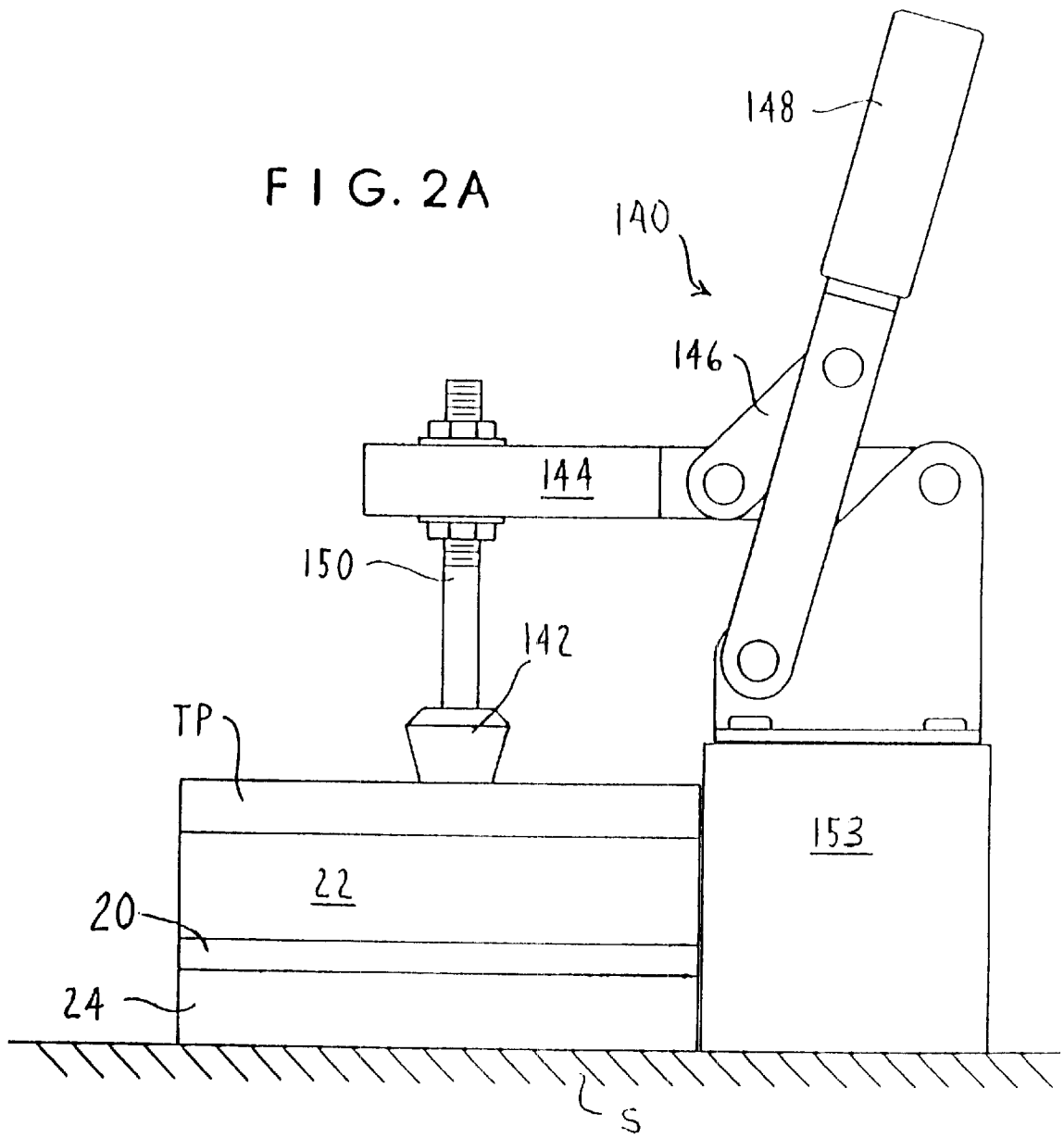
FIG. 2A is an elevational view in the direction of the root end of the core showing a locking lever clamp to clamp the setters of FIG. 1 together.

A clamp device 140 of the locking leverage type shown in FIG. 2A (e.g. available from Carl-Lane Company, St. Louis, Mo. or DE-STA-CO, Troy, Mich., is used to apply a force F to a steel or other top plate TP to clamp the top setter 22, peripheral edge of bladder 20, and the bottom setter 24 together with the green core C positioned therebetween with core side S1 engaging the bladder 20 and the core side S2 engaging the bottom setter surface 24a. The clamp force is adjusted to maintain the position of the top setter 22 relative to the lower setter 24 when the bladder 20 is pressurized.

In practicing a method of the invention, a fresh, hot (e.g 300 degrees F.) green ceramic core C is removed from the core die or mold (not shown) and placed on the bottom setter surface 24a. Flash on the core side S2 that could contact the setter surface 24a and interfere with proper positioning of the core on setter side 24a is quickly trimmed to permit proper location of the green core on the setter surface 24a. Alternately, the bottom setter 24 can be relieved at any suitable location(s) to accommodate any flash remaining on the core C. The top setter 22 then is placed atop the core C and clamped by clamp 140 to bottom setter 24. The cavity 26 is fluid pressurized to force the bladder 20 against the core side S1 to, in turn, hold the core side S2 under fluid pressure against the profile or contour of the setter surface 24a. The hot green core C is trimmed, placed and clamped between the setters 22, 24, and subjected to fluid pressure from bladder 20 quickly after removal from the core die or mold before the hot core substantially cools. For example, typically, the hot core C is trimmed, placed between setters 22, 24 which are clamped by clamp 140, and the cavity 26 pressurized within 5 seconds after removal of hot green ceramic core C from the core die or mold while the core C still exhibits some inherent plasticity as a result of its superambient temperature.

Setters 22, 24 are clamped together by a clamp 140, FIG. 2A, that includes a nose 142 that applies clamp force to top plate TP through an arm 144 connected to a toggle linkage 146 actuated by a pivotable handle 148. The force F applied to top plate TP is controlled by adjusting the threaded shaft 150 on which nose 142 is mounted up or down relative to the arm 144. The toggle linkage 146 connects the arm 144 and handle 148, which is pivotally mounted on a fixed base 153 resting on support S. The clamp device is available commercially from the sources described above.

Fluid (e.g. air) pressure in cavity 26 can range between 5 to 10 psi for purposes of illustration only as other cavity pressure values can be used depending upon the core setting parameters employed. Although core C may be slightly oversized or undersized in a core thickness direction, the pressurized bladder 20 engages the core C and the core in turn with the setter 24. The fluid pressure in cavity 26 is maintained until the green core C has cooled to a temperature where the core is rigidized to an extent that core deformation is not significant, typically a core temperature at or near room temperature. The fluid pressure then is released using an on/off valve 35 to ambient pressure, and the now rigid, green core C removed for finishing, gauging and other further processing operations forming no part of the invention.

During constraint of the core C between the setters 22, 24 while it cools from an elevated temperature to a room temperature, the pressurized compliant bladder 20 deforms enough against the side S1 of each green core C to increase surface contact therebetween, reduce localize regions of stress on the core, and promote greater contact of the core with the bladder and bottom setter to thereby reduce dimensional variations from one core to the next. The application of fluid pressure on bladder 20 during core cooling pursuant to this embodiment of the invention forces the compliant bladder 20 against the core side S1 to, in turn, hold the core side S2 under pressure against the profile or contour of the setter surface 24a to reduce core warpage, twisting or other unwanted core deformation, especially at the trailing edge E2 of thin airfoil shaped cores, that may be due to different regions of the core cooling at different rates.

In practicing the above embodiment of the invention, the thickness and durometer of the bladder 20, bladder/core surface friction, cavity air pressure, cavity air pressurization time, clamp force, setter temperature, setter materials and the like can be chosen depending on the ceramic core material, shape, and core processing parameters employed. For example, talc or other powder may be applied to the bladder 20 or core side S1 to adjust friction therebetween.

Figure 4A:
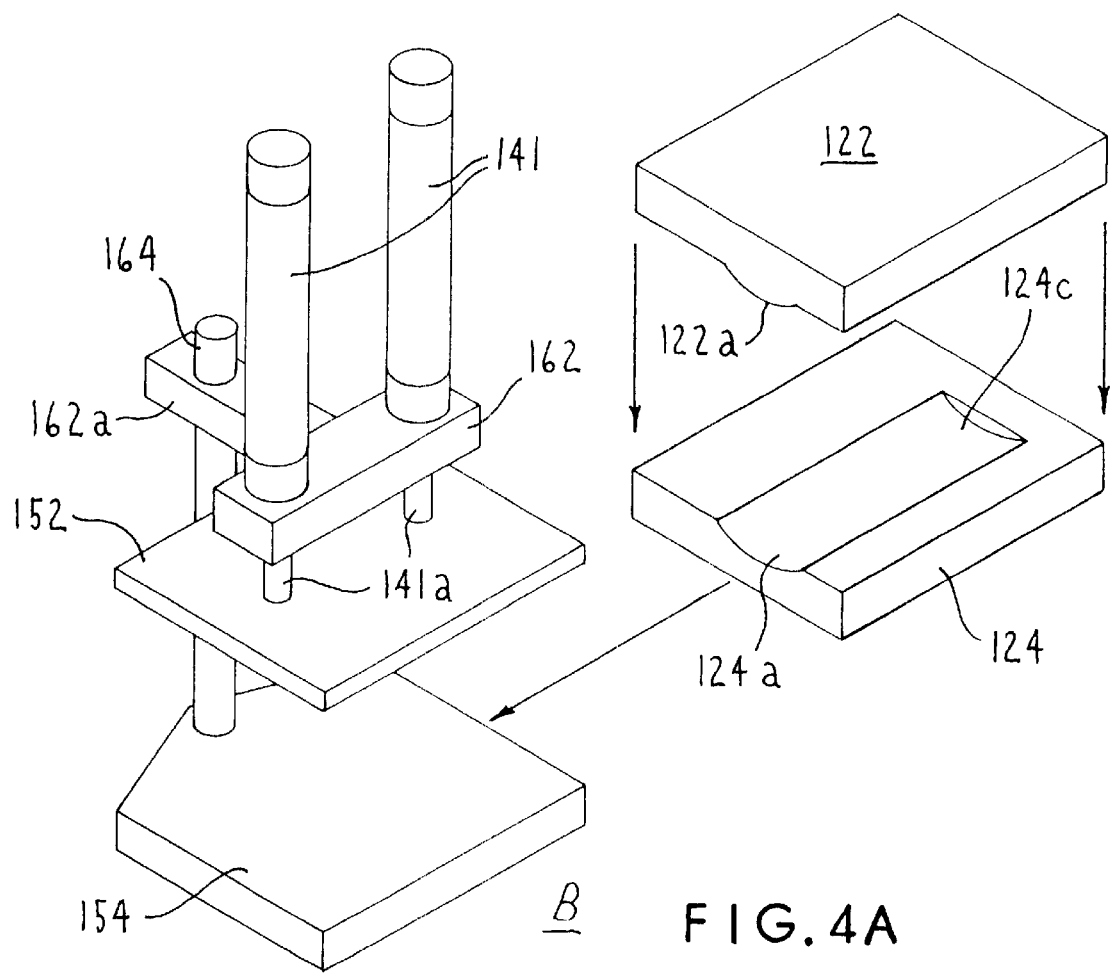
FIGS. 4A and 4B are perspective schematic views of a disassembled and assembled setter system, respectively, in accordance with a particular embodiment of the invention.
Figure 4B:
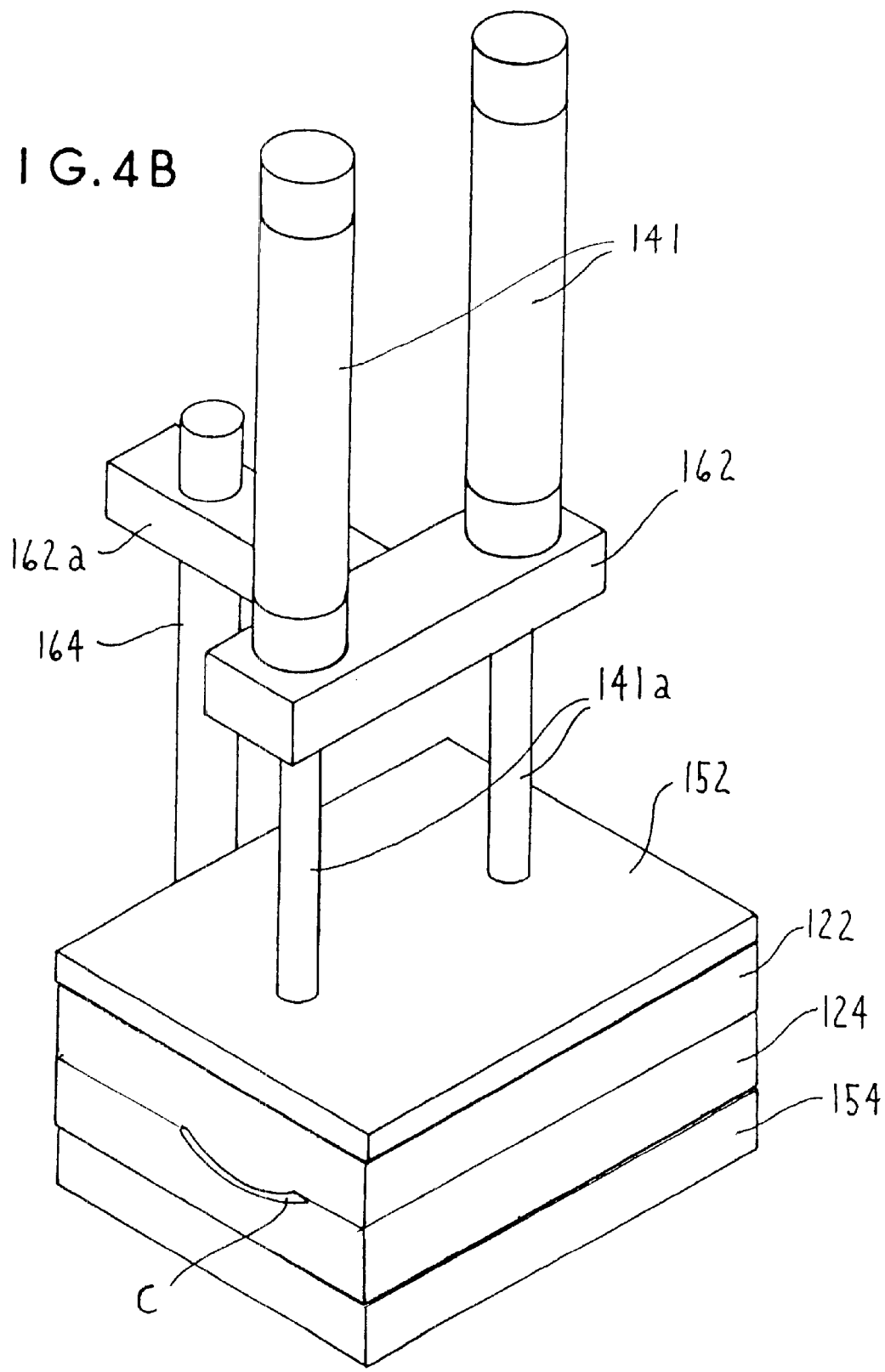

Referring to FIGS. 2 and 3, a green ceramic core C freshly removed from a core die or mold (not shown) and at elevated temperature (e.g 300 degrees F.) is shown schematically positioned and constrained in contact between a top setter 122 and a rigid bottom setter 124 (without bladder 20) while a clamp force F sufficient to force the core against the bottom setter 124 is applied by a pneumatic cylinders 141 of the type shown in FIGS. 4A, 4B during cooling of the green core to ambient temperature pursuant to another embodiment of the invention. Although core C may be slightly oversized or undersized in a core thickness direction, the force F engages the compliant setter 122 with the core C and in turn with the setter 124 as described below with the compliant setter 122 and setter 124 being in contact at their outer edge peripheries.

The non-rigid top setter 122 may comprise a body solely made of a compliant material, such as rubber, FIG. 2, or a rigid material such as metal, plastic (e.g REN plastic available from Ciba Geigy Company), ceramic or other material that includes a facing layer 123, FIG. 3, made of compliant material, such as the above rubber. The setter 122 or the facing layer 123 will have a surface 122a, 123a, FIGS. 2 and 3, with a profile or contour that corresponds to that of the facing first side S1 of the green ceramic core C to be constrained.

A suitable rubber for use as the setter 122, or the facing layer 123, comprises Rohn Poulanc silicone rubber V 340-A having a durometer value of 45-Shore 00 scale and resistant to temperatures of 500 degrees F., although other materials that are compliant in the context that the setter 122, or facing layer 123, deforms enough against the side S1 of each green core C during cooling to room temperature to increase surface contact therebetween, reduce localize regions of stress on the core, and promote greater contact of the core with the top and bottom setters 122, 124 to thereby reduce dimensional variations from one core to the next. The compliant material (e.g. rubber) typically will have a durometer value of about 45 Shore 00 scale.

The rigid bottom (second) setter 124 may comprise metal, plastic (e.g. REN plastic), ceramic or other relatively stiff/rigid material that includes a core receiving surface 124a that corresponds in profile or contour to the second side S2 of the green ceramic core C when the core is constrained between the setters 122, 124.

Pneumatic cylinders 141 are used as a clamp device to clamp the top setter 122, the core, and the bottom setter 124 together when the hot green core C freshly removed from the core die or mold is positioned therebetween with the core side S1 engaging the setter surface 122a, FIG. 2, or facing layer surface 123a, FIG. 3, and the core side S2 engaging the bottom setter surface 124a.

In particular, referring to FIG. 4A, a top setter 122 comprising the compliant rubber material described above and a bottom setter 124 comprising a relatively rigid material described above are shown disassembled relative to upper and lower clamping plates 152, 154. The upper setter 122 includes a contoured convex airfoil surface 122a and root surface (not shown) that corresponds in contour to that of the side S1 (see FIG. 3) of a turbine blade-shaped ceramic core (not shown in FIG. 4). The lower setter 124 includes a contoured concave airfoil surface 124a and root surface 124c that corresponds in contour to that of the side S2 (see FIG. 3) of the turbine blade-shaped ceramic core (not shown in FIG. 4). A platform surface between the root surface and airfoil surface of the turbine-shaped blade typically is present on the respective setters 122, 124 but is not shown for sake of convenience. The setters 122, 124 typically include respective female and male locating ribs or posts (not shown) that mate together when setters 122, 124 are assembled, FIG. 4B, to position them relative to one another.

The assembled setters 122, 124 are positioned between upper and lower clamping plates 152, 154. The upper plate 152 is connected to pistons 141a of a pair of pneumatic or other fluid cylinders 141. The cylinders 141 are mounted on a vertically adjustable cross member 162 that is mounted by arm 162a thereof on a stationary upstanding post 164. When the pistons 141a are extended downwardly, they press the plate 152 toward the lower plate 154 which rests on a table or other fixed support or base B. Thus, after the assembled setters 122, 124 are positioned between plates 152, 154, the pistons 141 are extended downwardly to clamp the setters together, FIG. 4B, under an applied force while a green core between the setters 152, 154 cools to room temperature.

In practicing a method of the invention, the hot (e.g 300 degrees F.) green ceramic core C is removed from the core die or mold (not shown) and placed on the bottom setter surface 124a. Flash on the core side S2 that could contact the setter surface 124a is trimmed to permit proper location of the green core on the setter surface 124a, or the setter 124 can be relieved to accommodate flash remaining on the core C. The top setter 122 quickly is placed atop the core C and clamped by clamp cylinders 141 to bottom setter 124 such that the non-rigid setter 122, FIG. 2, or non-rigid facing layer 123 thereon, FIG. 3, conforms against the core side S1 to, in turn, hold the core side S2 under force F against profile or contour of the setter surface 124a.

During constraint of the core C between the setters 122, 124 while it cools from an elevated temperature to a room temperature under applied force (e.g. 40 pounds force that depends on the size of the core) from clamp cylinders 141, the compliant top setter 122 deforms enough against the side S1 of each green core C to increase surface contact therebetween, reduce localize regions of stress on the core, and promote greater contact of the core with the top and bottom setters 122, 124 to thereby reduce dimensional variations from one core to the next.

In the embodiments of FIGS. 2–4, the green core C remains between setters 122, 124 until it has cooled to a temperature where core deformation is not significant, typically a core temperature at or near room temperature. The cylinders 141 then are released, and the now rigid, green core is removed for finishing, gauging and other further processing operations forming no part of the invention. The use of the compliant, non-rigid setter 122, or facing layer 123, during core cooling holds the core side S2 under pressure against profile or contour of the setter surface 124a to reduce core warpage, twisting or other unwanted core deformation, especially at the trailing edge E2 of thin airfoil shaped cores, that may be due to different regions of the core cooling at different rates.

In practicing the above embodiment of the invention, parameters such as setter/core surface friction, clamp force, setter temperature, setter materials and the like can be chosen depending on the ceramic core material and core processing parameters employed. Moreover, the surface of the upper setter 22, 122 can be roughened (e.g. grit blasted)

and/or provided with one or more backlock grooves or channels (not shown) around its periphery to receive and retain the bladder 20 or facing layer 123 thereon, especially when the bladder or facing layer is cast onto the setter 22, 122.

Although the invention has been described above with respect to manufacture of ceramic cores for casting metals and alloys, it is not so limited and can be used in manufacture of other articles prone to deformation or distortion as they cool from an elevated forming (e.g. molding) or treating (e.g. heat treatment) temperature to a lower temperature to reduce dimensional variations as the article cools from an elevated temperature to a lower temperature. Such articles may include ceramic articles other than ceramic cores (e.g. contoured ceramic components); wax, plastic or other patterns used in investment casting; powder metal injection moldings; plastic articles; laminated composites and others. For example, wax patterns for investment casting typically are injection molded in a pattern and then removed to cool to room temperature. The invention can be used to constrain the wax pattern between top and bottom setters during cooling down of the pattern from an elevated molding temperature to room temperature to reduce dimensional variations from one pattern to the next.

It will be apparent to those skilled in the art that variations can be made in the embodiments of the invention described without departing from the scope of the invention set forth in the claims.

We claim:

1. A method of making a ceramic core, comprising molding a ceramic material in a core mold or die to form a green core having a pre-molded core shape, removing said green core while being at an elevated temperature from said core mold or die, positioning said green ceramic core having said pre-molded shape and being at said elevated temperature between a rigid core setter and a compliant member, and holding said green core under pressure between and in contact with said rigid core setter and said compliant member while said green core cools to a lower temperature.

2. The method of claim 1 including engaging a side of said core with said compliant member that comprises a compliant fluid pressurized bladder and an opposite side of said core with said rigid setter.

3. The method of claim 1 including engaging a side of said core with said compliant member that comprises a compliant, non-rigid setter surface and engaging an opposite side of said core with said rigid setter.

4. The method of claim 3 wherein the compliant non-rigid setter surface comprises a surface of a compliant setter.

5. The method of claim 3 wherein the compliant non-rigid setter surface comprises a compliant layer on a another rigid setter.

6. The method of claim 1 including removing the green core from between said setter and said compliant member when core temperature falls to said lower temperature.

7. The method of claim 1 wherein said compliant member comprises silicone rubber.

* * * * *